United States Patent
Liao et al.

(10) Patent No.: US 7,335,868 B2
(45) Date of Patent: Feb. 26, 2008

(54) EXPOSURE CONTROL SYSTEM AND METHOD FOR AN IMAGE SENSOR

(75) Inventors: Tung-Tsai Liao, Hsinchu (TW); Kuo-Chun Fan, Waipu Township, Taichung County (TW); Li-Ming Chen, Keelung (TW); Chia-Kang Hsu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 182 days.

(21) Appl. No.: 11/255,034

(22) Filed: Oct. 21, 2005

(65) Prior Publication Data

US 2006/0238643 A1 Oct. 26, 2006

(30) Foreign Application Priority Data

Apr. 21, 2005 (TW) .............................. 94112761 A

(51) Int. Cl.
*G01J 1/32* (2006.01)
(52) U.S. Cl. ..................... 250/205; 356/218; 356/221
(58) Field of Classification Search ................ 250/205, 250/221; 356/218, 221; 345/166
See application file for complete search history.

(56) References Cited

U.S. PATENT DOCUMENTS

| | | | |
|---|---|---|---|
| 6,654,062 B1 * | 11/2003 | Numata et al. | 348/362 |
| 2003/0007088 A1 * | 1/2003 | Rantanen et al. | 348/371 |
| 2005/0161582 A1 * | 7/2005 | Lee et al. | 250/205 |
| 2005/0190158 A1 * | 9/2005 | Casebolt et al. | 345/166 |
| 2005/0231482 A1 * | 10/2005 | Theytaz et al. | 345/166 |

* cited by examiner

*Primary Examiner*—Georgia Epps
*Assistant Examiner*—Stephen Yam
(74) *Attorney, Agent, or Firm*—Bacon & Thomas, PLLC

(57) ABSTRACT

An exposure control system and method for an image sensor, which includes an image sensor, an illuminator, a controller and a light separator. The image sensor has plural photosensitive pixels in a two-dimensional matrix arrangement. When an exposure is operated in a sub-region of the plural photosensitive pixels, the illuminator produces a flashlight as a light source for exposure. The light separator eliminates light except the flashlight. The controller sequentially activates each row of pixels in the sub-region, and when each row of pixels is in an exposure state, the controller drives the illuminator to produce the flashlight.

25 Claims, 7 Drawing Sheets

EXPOSURE CONTROL SYSTEM AND METHOD FOR AN IMAGE SENSOR

BACKGROUND OF THE INVENTION

1. Field of the Invention

The invention relates to the technical field of image sensing and, more particularly, to an exposure control system and method for an image sensor.

2. Description of Related Art

In using an image sensor, a shutter is typically arranged in front of the image sensor to control the exposure amount and time for the image sensor. Such a shutter can be a mechanical or electronic shutter. In order to meet with compact size requirement, light and low cost requirement for a product, the electronic shutter has become the preferred device equipped with the image sensor.

The electronic shutter uses an internal electronic signal of the image sensor to control the entire exposure timing and procedure. In a typical CMOS image sensor, the operations of reset, exposure and read of its internal devices are in a row-by-row manner. As shown in FIG. 1, a row will be reset before to expose the row of pixels. To have an identical exposure time for each row, consecutive rows are reset at a constant rate. Next, the electronic shutter at each row is opened/closed sequentially for exposure. Such a shutter is referred to as a rolling electronic shutter.

Accordingly, an illuminator requires being kept in an open state to provide the required light source for the exposure procedure of all rows. As a result of a long exposure time, the illuminator cannot use a high-power light source otherwise the illuminator would be burned. Namely, the illuminator consumes a smaller current, such as 150 mA, between T3 and T4. However, even though the illuminator consumes the smaller current, the exposure time is long so that the entire power consumption is relatively high. To reduce the power consumption, a brightness of the illuminator is reduced. However, such reduction may require a closer distance between the illuminator and an object surface. Thus, the irradiated angle cannot be increased effectively. In addition, the electronic shutter at each row of the CMOS image sensor needs to prolong its open time to obtain enough illumination. Unfortunately, such a way may easily result in an image blur effect because of the long exposure time. Conversely, if the exposure time is reduced, the CMOS image sensor requires an enlarged sensitive area in order to obtain enough light.

To overcome the problem, U.S. Pat. No. 2003/0007088 A1 discloses that a multi-flashlight is used in an exposure of the image sensor to thus obtain an identical averaged exposure amount for each row of pixels of the image sensor. As shown in FIG. 2, the first flashlight illuminates only on rows 0-11, not on rows 12-31. Also, the second flashlight influences only on rows 12-23, not on rows 0-11 and 24-31. In this case, each row receives only one flashlight so as to have identical exposure amount for each pixel from row 0 to row 31. However, when an object is moving between T1 and T2, its image may present a cracked effect.

Therefore, it is desirable to provide an improved system and method to mitigate and/or obviate the aforementioned problems.

SUMMARY OF THE INVENTION

The object of the invention is to provide an exposure control system and method of an image sensor, which can avoid the prior problem that each row of pixels has a uniform exposure amount, and thus increase the captured image quality.

In accordance with one aspect of the present invention, there is provided an exposure control system for an image sensor. The system includes an image sensor, an illuminator, a controller and a light separator. The image sensor has plural photosensitive pixels in a two-dimensional matrix arrangement. When an exposure is operated in a sub-region of the plural photosensitive pixels, each row of pixels in the sub-region has an exposure state. The illuminator produces a flashlight as a light source for exposure. The controller is connected to the image sensor and the illuminator to control exposure timing of the image sensor and timing of producing the light source by the illuminator. The light separator is connected to the image sensor to reduce light interference and to allow the flashlight to be sent to the image sensor. The controller sequentially activates each row of pixels in the sub-region, and when all rows in the sub-region are in the exposure state, the controller drives the illuminator to produce the flashlight and controls a flashing period of the flashlight.

In accordance with another aspect of the present invention, there is provided an exposure control system for an image sensor. The system includes an image sensor, an illuminator, a controller and a light separator. The image sensor has plural photosensitive pixels in a two-dimensional matrix arrangement. When an exposure is operated in a sub-region of the plural photosensitive pixels, each row of pixels in the sub-region has an exposure state. The illuminator produces a flashlight as a light source for exposure. The controller is connected to the image sensor and the illuminator to control the exposure timing of the image sensor and the timing of producing the light source by the illuminator. The light separator includes a cover and a base. The image sensor, the illuminator and the controller are fixedly arranged inside the light separator in order to reduce light interference and allow the flashlight to be sent to the image sensor. The controller sequentially activates each row of pixels in the sub-region, and when all rows in the sub-region are in the exposure state, the controller drives the illuminator to produce the flashlight and controls a flashing period of the flashlight.

In accordance with a further aspect of the present invention, there is provided an exposure control method for an image sensor, which performs an exposure on an image sensor. The image sensor has plural photosensitive pixels in a two-dimensional matrix arrangement. An exposure is operated in a sub-region of the plural photosensitive pixels. A light separator is implemented in the image sensor to reduce light interference and to allow a flashlight to be sent to the image sensor. The method includes the steps: a resetting step, which concurrently resets each row of pixels in the sub-region to an initial state; an exposure activating step, which sequentially or concurrently activates each row in the sub-region to enter an exposure state; an illuminating step, which produces the flashlight as a light source for exposure; and a processing step, which sequentially samples each row in the sub-region to thus obtain an exposure image of an object, wherein the flashlight is produced when all rows in the sub-region are in the exposure state, and a flashing period of the flashlight is controlled.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
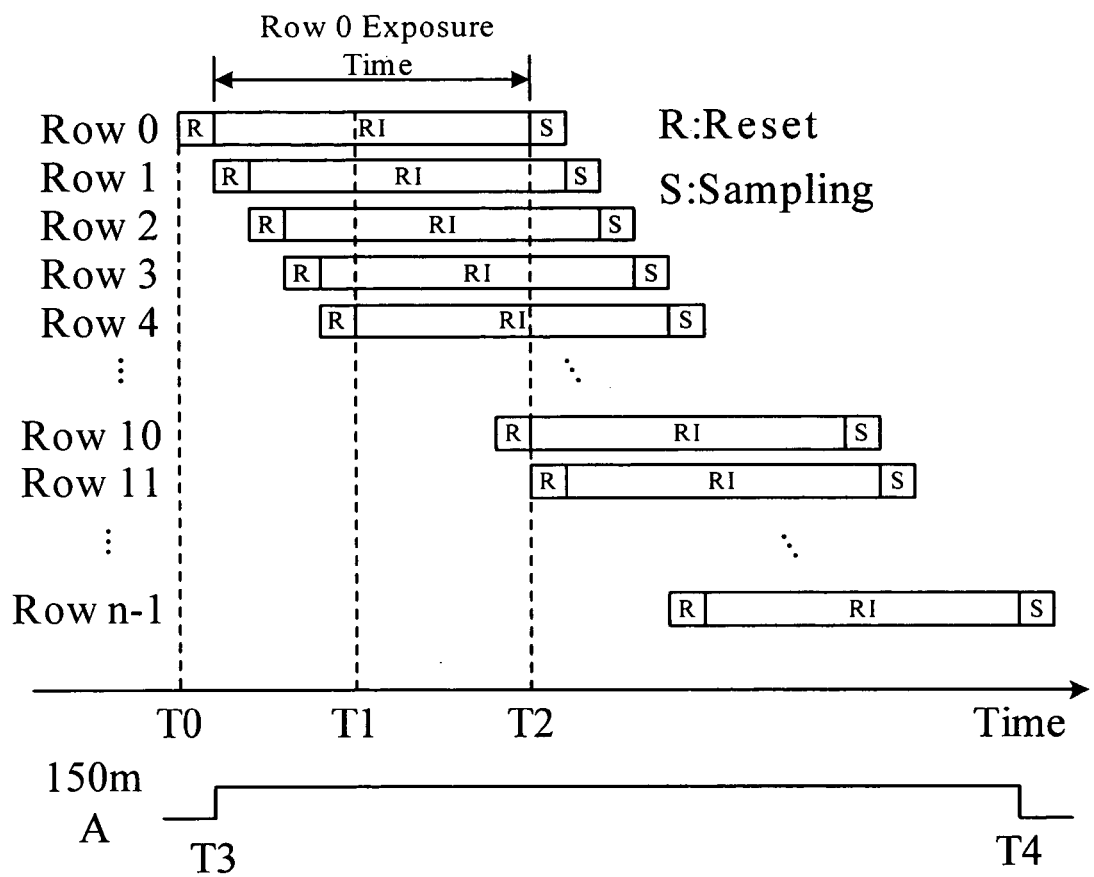
FIG. 1 is a schematic diagram of an exposure with a typical rolling electronic shutter.
Figure 2:
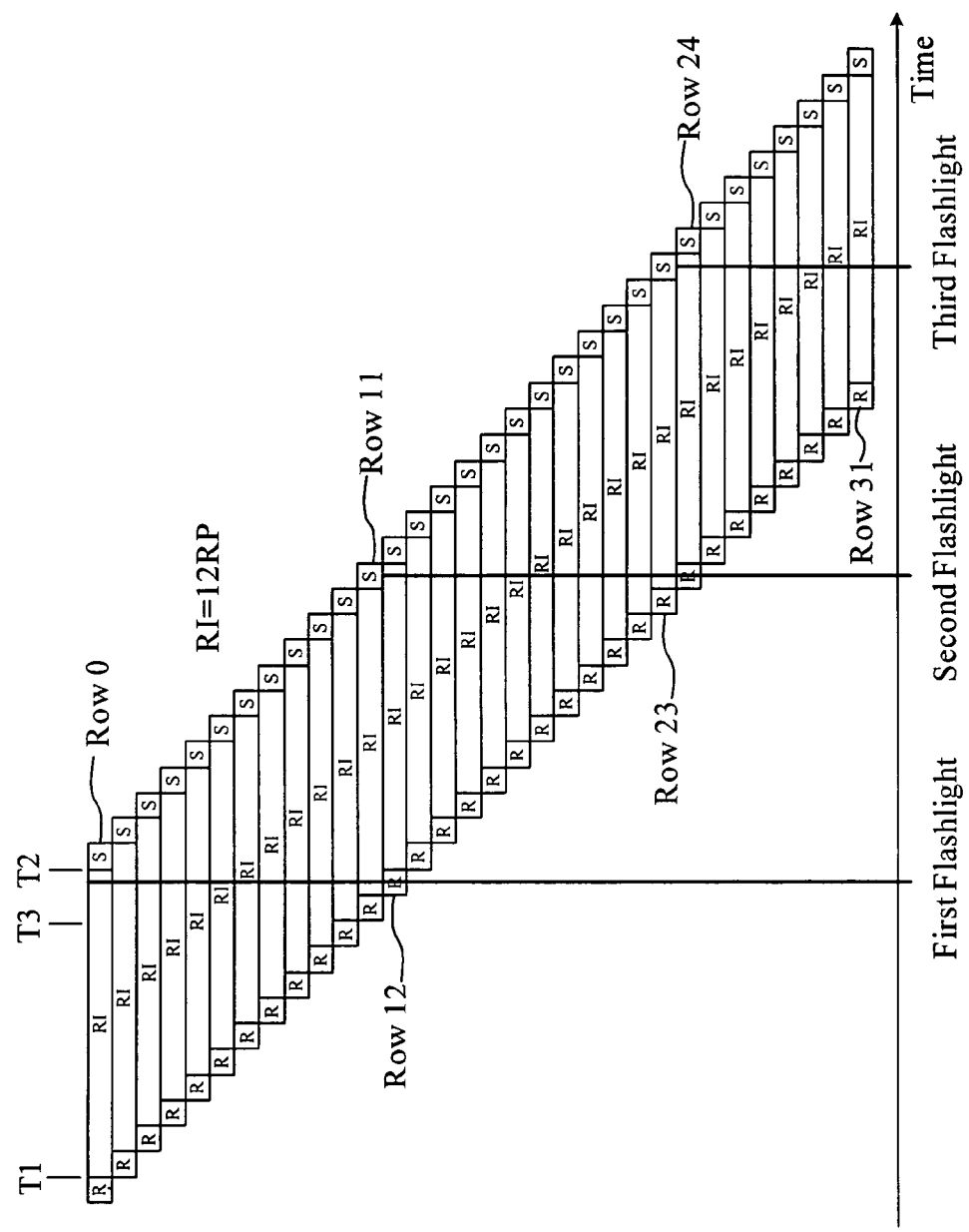
FIG. 2 is a schematic diagram of an exposure with a typical multi-flashlight.
Figure 3:
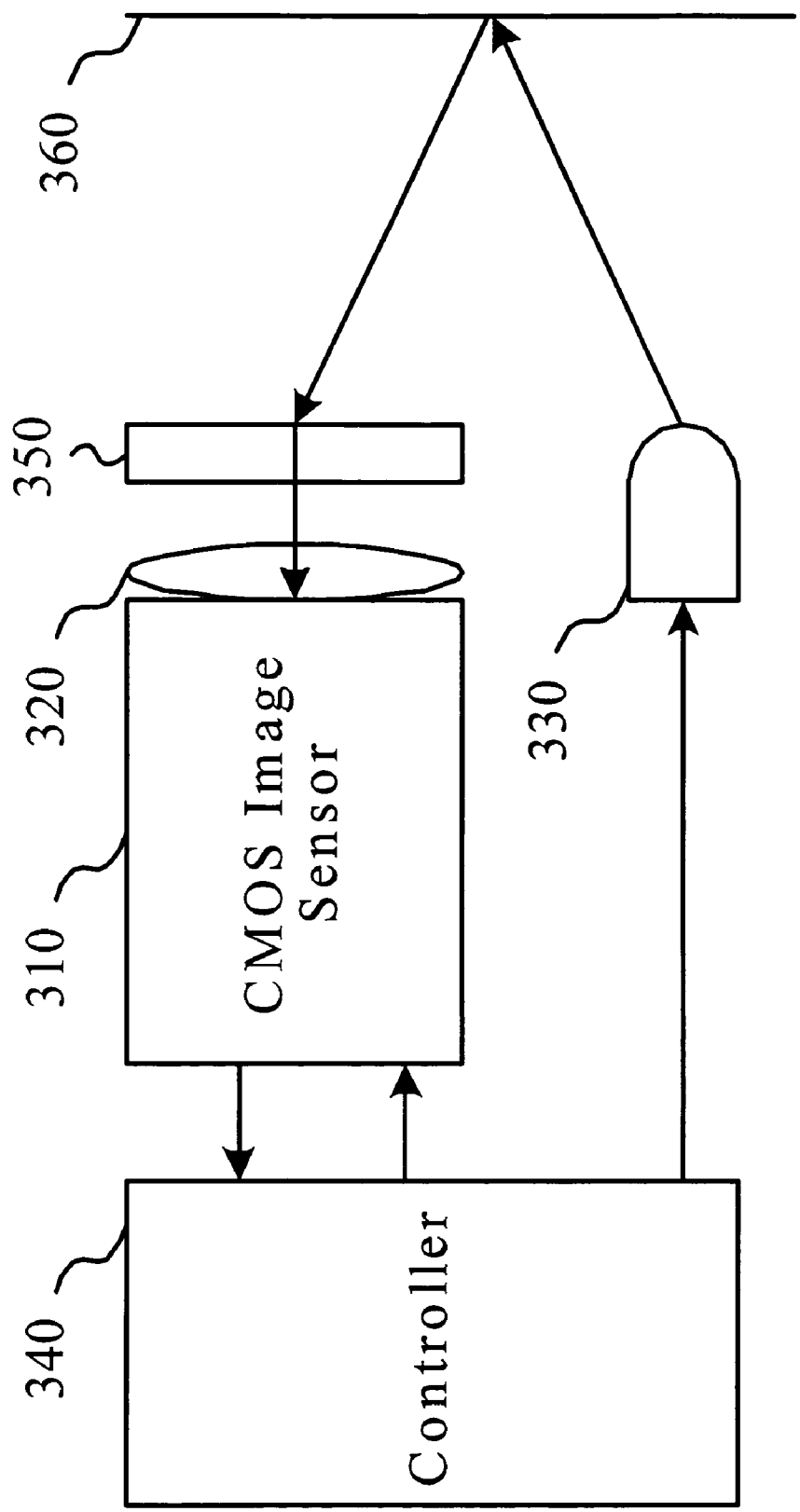
FIG. 3 is a block diagram of an embodiment of an exposure control system for an image sensor in accordance with the invention.

FIG. 3 is a block diagram of an embodiment of an exposure control system for an image sensor in accordance with the invention. As shown in FIG. 3, the system includes an image sensor 310, a convex set 320, an illuminator 330, a controller 340 and a light separator 350.

The image sensor 310 is a CMOS image sensor having plural photosensitive pixels in a 2D matrix arrangement. The CMOS image sensor 310 may have 640×480, 659×494, 752×480 photosensitive pixels, and the like. For different applications, the CMOS image sensor can set its active region to an appropriate size, i.e. a sub-region of the plural photosensitive pixels. For example, an active region of 320×240 is set for a 640×480 CMOS image sensor. In this embodiment, an exposure is operated in a sub-region of the plural photosensitive pixels, and the sub-region can have a size of 320×240, 96×96 or the entire region.

The illuminator 330 produces a flashlight as a light source for exposure to the image sensor 310. The illuminator 330 can be a non-thermal light source or infrared light. Such a non-thermal light source includes laser light sources and light emitting diodes (LEDs).

The convex set 320 includes a convex lens and a diaphragm. One face of the convex set 320 faces to the CMOS image sensor 310 to collect and enhance the light that enters the image sensor 310. The convex lens is formed of a transparent material, such as glass or plastic. A flashlight produced by the illuminator 330 is reflected by an object 360, the reflected light is further focused by the convex set 320 and sent to the image sensor 310 to create an image. The diaphragm can be adjusted to have a smaller diameter size when the light has high brightness, thereby obtaining a great depth of field so as to enable easier focus.

When the illuminator 330 is a laser, because the laser can produce a light with higher brightness, the depth of field is increased so as to enable easier focus.

The light separator 350 is implemented with respect to the CMOS image sensor 310 to reduce light interference and to allow the flashlight produced by the illuminator 330 such that the flashlight is sent to the image sensor 310. When the illuminator 330 is an infrared (IR) light source, the light separator 350 is an IR filter or an external light blocking device.

The controller 340 is connected to the image sensor 310 and the illuminator 330 in order to control the exposure timing of the image sensor 310 and the timing of producing the light source by the illuminator 330. At exposure, the controller 340 drives the illuminator 330 in an exposure time to produce the flashlight and to control a flashing period and brightness of the flashlight produced. Thus, the flashlight produced can have an identical photosensitive effect to the photosensitive pixels in the sub-region through a reflective light of an object 360. The controller 330 can adaptively adjust the flashing period and brightness of the flashlight to thus obtain an optimized image quality and illumination energy consumption.

Figure 4:
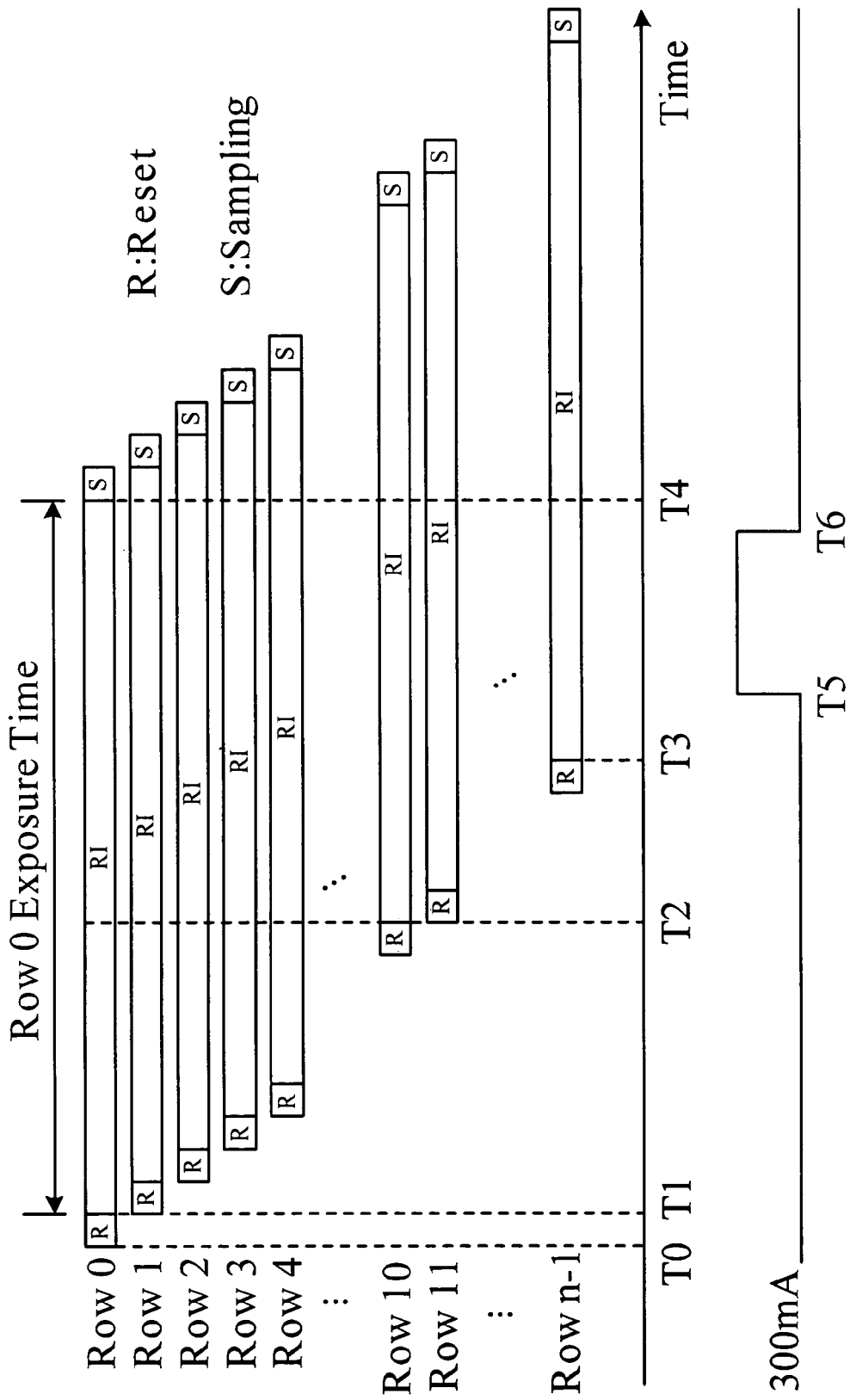
FIG. 4 is a schematic diagram of an exposure control method for an image sensor in accordance with the invention.

FIG. 4 is a schematic diagram of an exposure control method for an image sensor in accordance with the invention. As shown in FIG. 4, the exposure time for row 0 is changed from T1-T2 to T1-T4, and the exposure end time (T4) of row 0 is after the exposure start time (T3) of row n-1. Namely, the shutter from rows 0 to row n-1 is open in the time from T3 to T4. However, due to the light separator 350, it is not easy to present noises at row 0 in the time from T1 to T4. The illuminator 330 produces a flashlight in the time from T5 to T6. Due to the short exposure time, the illuminator 330 can be a high power source to allow row 0 to row n-1 to be sensitive uniformly. Due to the exposure time short and the high power source used, light produced by the illuminator 330 can have an effect similar to flashing.

Figure 5:
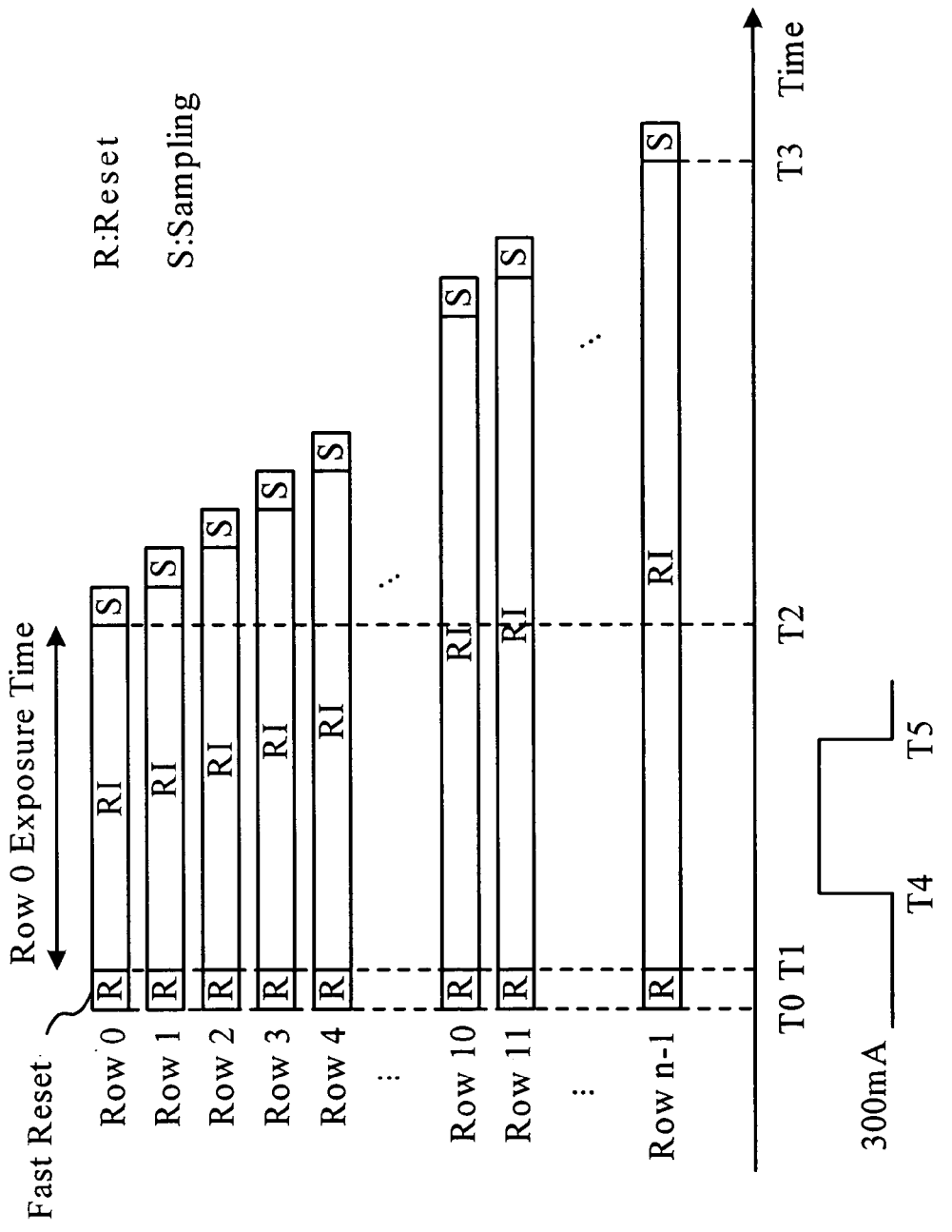
FIG. 5 is a schematic diagram of another embodiment of an exposure control method for an image sensor in accordance with the invention.

FIG. 5 is a schematic diagram of another exposure control method for an image sensor in accordance with the invention. As shown in FIG. 5, at time T0, the controller 340 produces a reset signal to reset the pixels in the sub-region of the image sensor 310 so as to enter each row of pixels into an initial state. At time T1, each row of pixels is exposed. Since the light separator 350 allows only the flashlight to be sent to the image sensor 310, the surrounding light cannot enter the image sensor 310. The controller 340 drives the illuminator 330 to produce a flashlight as a light source for exposure to the image sensor 310 before the exposure end time (T2) of row 0. The illuminator 330 produces a flashlight in the time from T4 to T5, which consumes a larger current, such as 300 mA. However, due to the short exposure time, the entire power consumption can be smaller than in the prior art. At time T2, the controller 340 sequentially produces a sampling signal to perform data sampling on rows 0 to n-1.

Figure 6:
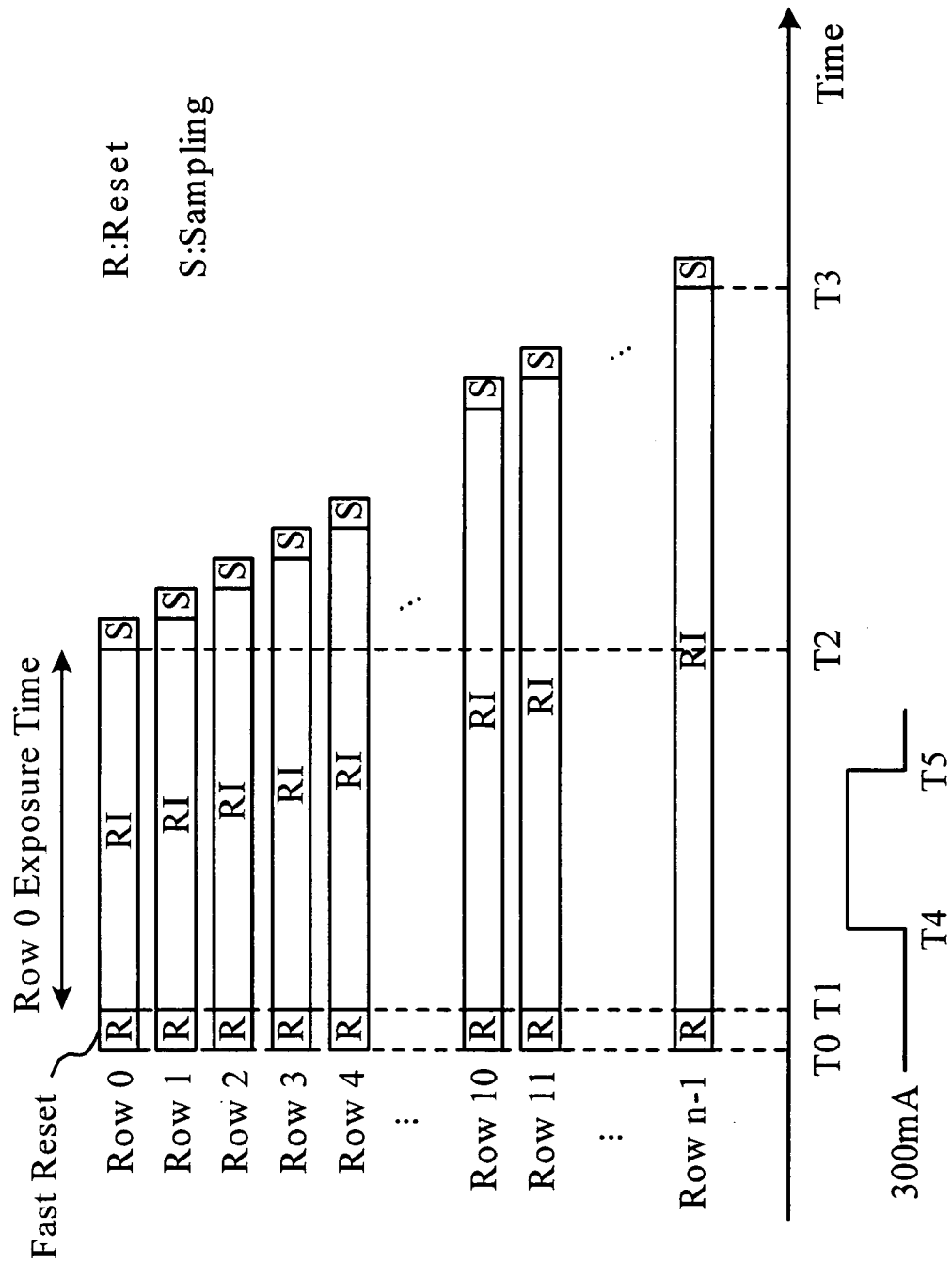
FIG. 6 is a schematic diagram of a further embodiment of an exposure control method for an image sensor in accordance with the invention.

FIG. 6 is a schematic diagram of a further exposure control method for an image sensor in accordance with the invention, which is similar to that of FIG. 5 except that, at time T2, the controller 340 increases a clock speed of the image sensor 310 to accordingly speed up the data sampling on rows 0 to n-1.

Figure 7:
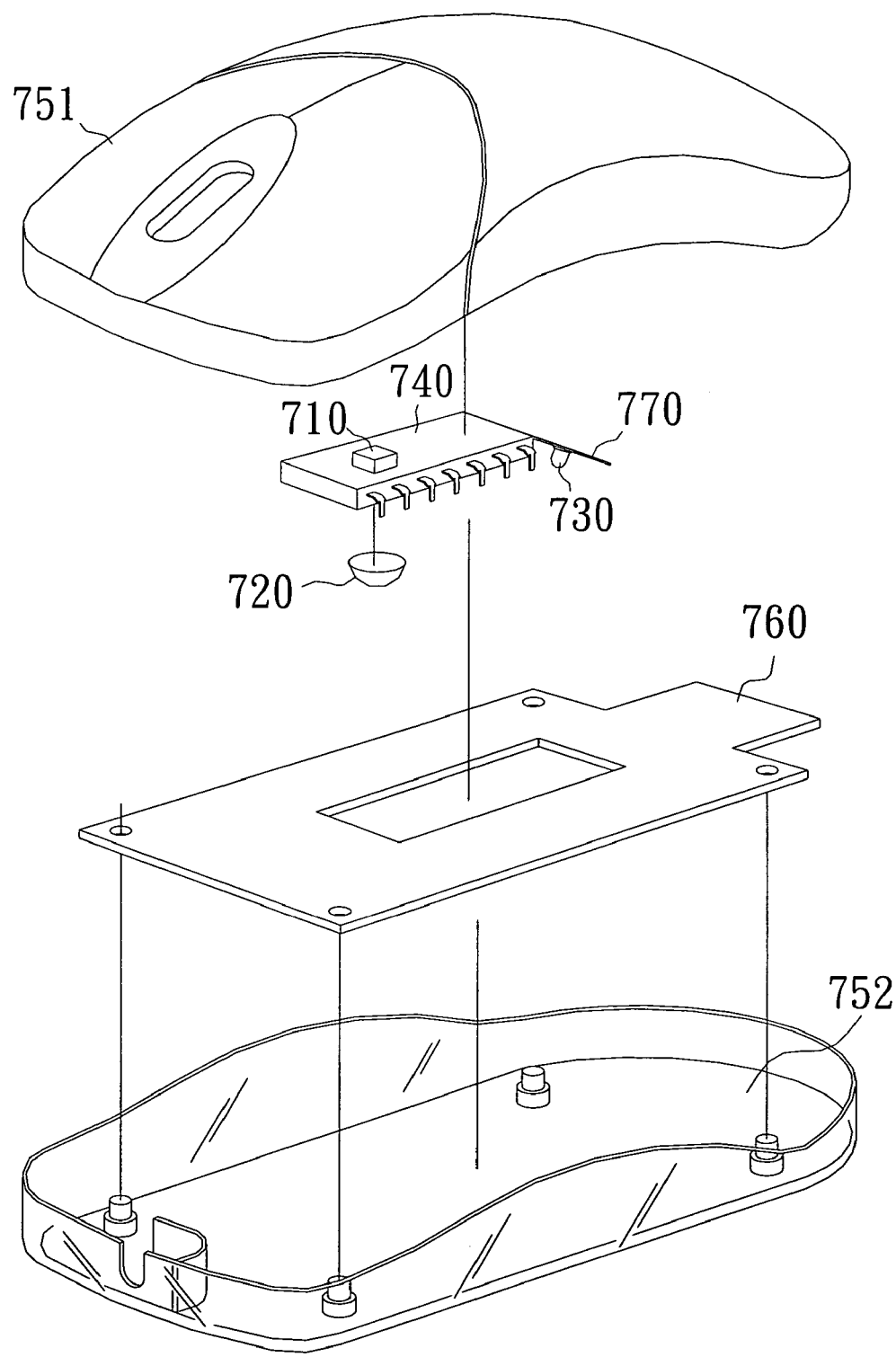
FIG. 7 is an exploded view of another embodiment of an exposure control system for an image sensor in accordance with the invention.

FIG. 7 is an exploded view of another embodiment of an exposure control system for an image sensor in accordance with the invention. As shown in FIG. 7, the system includes an image sensor 710, a convex lens 720, an illuminator 730, a controller 740, a light separator 750, an extension arm 770 and a circuit board 760. As compared to the embodiment of FIG. 3, the main difference is the light separator 750 being formed of a cover 751 and a base 752. The circuit board 760 is fixedly implemented in the light separator 750 and is provided with a controller 740. One side of the controller 740 has the extension arm 770 provided with the illuminator 730 to provide an illumination at exposure to the image sensor 710.

The image sensor 710, the convex lens 720, the illuminator 730 and the controller 740 are fixedly implemented in the light separator 750 such that a light outside the light separator 740 is eliminated and only a light produced by the illuminator 730 is sent to the image sensor 710. In this case, the illuminator 730 can be a non-thermal light source, infrared light or a white light with multiple wavelengths. The non-thermal light source includes a laser, LED and the like.

The exposure of the image sensors 310 and 710 in accordance with the invention is operated by row-to-row, but a column-by-column exposure can also be used and easily achieved by a person skilled in the prior art.

In view of the foregoing, it is known that, in the present invention, all rows of pixels in the sub-region can concurrently be sensitive. Due to the short sensitive time, the quality of extracted images has a high stability. Because the object 360 has a small movement distance relate to the short sensitive time, the extracted images do not present the effect of segmentation. The illuminator 330 produces the illumination by a flash-like way. Even though the illumination has a high brightness, due to the short exposure time, the entire averaged power consumption is lower than that in the prior art. Also, due to the illumination of high brightness, the sensitive area of the image sensor 310 can be reduced, and a distance between the illuminator 330 and the object 360 can be increased such that a sensitive angle of the image sensor 310 can be increased. The cost of the sensor 310 can further be reduced due to the reduced sensitive area.

Although the present invention has been explained in relation to its preferred embodiment, it is to be understood that many other possible modifications and variations can be made without departing from the spirit and scope of the invention as hereinafter claimed.

What is claimed is:

1. An exposure control system for an image sensor, comprising:
   an image sensor, which has plural rows of photosensitive pixels in a two-dimensional matrix arrangement, each row of pixels in a sub-region has an exposure state when an exposure is operated in the sub-region of the plural rows of photosensitive pixels;
   an illuminator, which produces a flashlight as a light source for exposure;
   a controller, which is connected to the image sensor and the illuminator to control exposure timing of the image sensor and timing of producing the light source by the illuminator;
   a light separator, which is implemented with respect to the image sensor to reduce light interference and to allow the flashlight to be sent to the image sensor; and
   a convex lens, which has one face against the image sensor and the other face facing the light separator in order to focus the flashlight that enters the image sensor;
   wherein the controller sequentially activates each row of pixels in the sub-region, and when all rows in the sub-region are in the exposure state, the controller drives the illuminator to produce the flashlight and controls a flashing period or brightness of the flashlight.

2. The system as claimed in claim 1, further comprising:
   a diaphragm, which adjusts its diameter size in accordance with an exposure brightness received by the image sensor.

3. The system as claimed in claim 1, wherein the image sensor is a CMOS image sensor.

4. The system as claimed in claim 1, wherein the illuminator is a laser.

5. The system as claimed in claim 1, wherein the illuminator is a light emitting device (LED).

6. The system as claimed in claim 1, wherein the illuminator is an infrared (IR) light.

7. The system as claimed in claim 6, wherein the light separator is an IR filter.

8. The system as claimed in claim 1, wherein the controller adaptively adjusts the flashing period and brightness of the flashlight to thus obtain optimized image quality and illumination energy consumption.

9. The system as claimed in claim 1, wherein the sub-region covers a part or all of the plural photosensitive pixels.

10. An exposure control system for an image sensor, comprising:
    an image sensor, which has plural rows of photosensitive pixels in a two-dimensional matrix arrangement, each row of pixels in a sub-region has an exposure state when an exposure is operated in the sub-region of the plural photosensitive pixels;
    an illuminator, which produces a flashlight as a light source for exposure;
    a controller, which has an extension arm at one side to provide, with the illuminator, for illumination at exposure to the image sensor and is connected to the image sensor and the illuminator to control exposure timing of the image sensor and timing of producing the light source by the illuminator;
    a light separator, which has a cover and a base to fixedly arrange the image sensor, the illuminator and the controller inside to thus reduce light interference and allow the flashlight to be sent to the image sensor; wherein the controller sequentially activates each row of pixels in the sub-region, and when all rows in the sub-region are in the exposure state, the controller drives the illuminator to produce the flashlight and adaptively controls a flashing period or brightness of the flashlight.

11. The system as claimed in claim 10, further comprising:
    a convex lens, which has one face against the image sensor to focus light that enters the image sensor.

12. The system as claimed in claim 11, further comprising:
    a diaphragm, which adjusts its diameter size in accordance with an exposure brightness received by the image sensor.

13. The system as claimed in claim 10, wherein the image sensor is a CMOS image sensor.

14. The system as claimed in claim 10, wherein the illuminator is a laser.

15. The system as claimed in claim 10, wherein the illuminator is a light emitting device (LED).

16. The system as claimed in claim 10, wherein the illuminator is an infrared (IR) light device.

17. The system as claimed in claim 10, wherein the illuminator is a white light generator.

18. The system as claimed in claim 10, wherein the controller adaptively adjusts the flashing period and brightness of the flashlight to thus obtain optimized image quality and illumination energy consumption.

19. The system as claimed in claim 10, wherein the sub-region covers a part or all of the plural rows of photosensitive pixels.

20. An exposure control method for an image sensor, which performs an exposure on an image sensor with plural photosensitive pixels in a two-dimensional matrix arrangement, such that the exposure is operated in a sub-region of the plural photosensitive pixels, and a light separator is implemented in the image sensor to reduce light interference and to allow a flashlight to be sent to the image sensor, the method comprising the steps:

a resetting step, which concurrently resets each row of pixels in the sub-region to an initial state;

an exposure activating step, which activates each row in the sub-region to enter an exposure state;

an illuminating step, which produces the flashlight as a light source for exposure; and a processing step, which sequentially samples each row in the sub-region to thus obtain an exposure image of an object;

wherein the flashlight is produced when all rows in the sub-region are in the exposure state, and a flashing period of the flashlight is controlled.

21. The method as claimed in claim 20, wherein the image sensor is a CMOS image sensor.

22. The method as claimed in claim 20, wherein the exposure to the image sensor is operated by a row-by-row manner.

23. The method as claimed in claim 20, wherein the exposure to the image sensor is operated by a column-by-column manner.

24. The method as claimed in claim 20, wherein the exposure activating step sequentially activates each row in the sub-region to enter the exposure state.

25. The method as claimed in claim 20, wherein the exposure activating step concurrently activates each row in the sub-region to enter the exposure state.

\* \* \* \* \*